United States Patent [19]

Genge

[11] 4,418,902

[45] Dec. 6, 1983

[54] ADJUSTABLE PORTABLE SAW GUIDE DEVICE

[76] Inventor: Charles A. Genge, 108 Regent St., Apt. 6, Kingston, Ontario, Canada, K7L 4J8

[21] Appl. No.: 329,583

[22] Filed: Dec. 10, 1981

Related U.S. Application Data

[62] Division of Ser. No. 158,202, Jun. 10, 1980, Pat. No. 4,307,513.

[51] Int. Cl.³ .............................................. B25B 1/10
[52] U.S. Cl. ................................................... 269/258
[58] Field of Search .................... 30/372; 83/743, 745, 83/455, 454; 269/249, 258, 182

[56] References Cited

U.S. PATENT DOCUMENTS

| 150,900 | 5/1874 | Silver | 269/258 X |
| 3,910,146 | 10/1975 | Earl | 83/745 |
| 4,281,572 | 8/1981 | Stovall | 83/745 |

Primary Examiner—Jimmy C. Peters
Attorney, Agent, or Firm—Littlepage & Webner

[57] ABSTRACT

Apparatus for guiding a power circular saw across a workpiece and effecting splinterless cutting thereof and having a saw guide assembly with a shield member, a base member, the guide assembly being inoperative association with the workpiece.

3 Claims, 5 Drawing Figures

ADJUSTABLE PORTABLE SAW GUIDE DEVICE

This application is a division of application Ser. No. 158,202, filed June 10, 1980, U.S. Pat. No. 4,307,513.

BACKGROUND OF THE INVENTION

This invention relates to apparatus for guiding portable power saws along a predetermined cutting path. More specifically, apparatus which provides guide asembly which can accommodate most power circular saws for cutting and trimming doors and other workpieces made of plywood, veneer, and particle board such as masonite.

The invention of portable power saws effected a revolution in carpentry and the building trades. On-site work could be conveniently done without having to drag a bulky table saw to the work site. Portable power saws are relatively inexpensive, are easily secured and stored when not in use, and take up little room.

Portable power saws have shortcomings, foremost is their inability to make accurate long cuts in plywood, particle board or lumber of sizeable length. Saw guides have been devised to solve this problem, as exemplified in U.S. Pat. Nos. 3,874,261, Murray; 4,028,976, Kundikoff; 3,983,776 and 4,050,340 Flanders; 4,059,038 Rietema; 4,075,920, Neal; 4,095,632 Raulinaitis; and others. These guides work well for the purpose of a simple saw guide but there is a problem of the tendency to chip and splinter along the saw kerf when working with particle board and especially veneer. This problem is especially acute when a carpenter has to trim doors and materials with finished surfaces as veneers on both sides, which is not solved by the splinter reducing method of placing the single veneer side down. When working with materials having double veneered sides such as doors, the circular blade cuts in an upward motion and splinters the upper veneer surface along the kerf.

One solution devised for this problem is to use a twin bladed scribing device to score two parallel lines on the workpiece which form the outer limits of the kerf of the intended cut. This feature may be seen in the device sold under the trade name "Guide 'N Scribe" made by Penn Scarf Mfg. Co. This method entails an extra separate step in the cutting procedure. A more practical solution is incidentally mentioned in U.S. Pat. No. 4,075,920, Neal. That patent discloses two guides, one for the baseplate edge of the saw farthest from the saw blade, and another edge guide configuous with the blade itself.

Close contact of a portion of the Neal saw guide to the workpiece prevents splintering by providing support to the wood that is cut.

But the Neal device has several serious drawbacks that become evident during use. The "Guide plate" of the Neal invention must be cut to size by the saw. This operation is performed so that the saw baseplate rests snugly between the inner guide edge and the guide edge. Once this cut is made, in contrast to the present invention, further adjusting cuts of the guide edge are difficult or impossible because the severable portion is not wide and is secured to the rest of the "Guide plate" by a tongue and groove joint. Renewable guide edges will be required when different saws with differing baseplate widths are used and also when the set of the saw blade wears down. Blunting of the saw teeth is common due to hidden metal fasteners frequently found under the veneer of doors, and also by the inevitable wearing of saw teeth through use.

The present invention also provides a more convenient clamping device for multiple jobs.

SUMMARY OF THE INVENTION

The present invention provides for an apparatus for guiding a portable power circular saw to make rapid, accurate splinter-free cuts in wood, veneer, plywood, particle board or other soft material. The apparatus of the invention is designed for use with most portable power saws, involving a guide surface for the saw baseplate and an initial cutting of a trimable base member to form a base member edge guide which abuts the saw blade, and delineates, the line of cut (kerf) to be made by the blade.

A feature of the invention further provides for continual renewal of the edge guide by first readjusting the relationship between a shield member having the saw baseplate guide surface and the trimable base member, re-securing the members and then cutting a new reference edge guide in the base member. Such renewal of the edge guide is desirable due to change of saws, blade wear, change in blade set, etc.

The base member and its renewable edge guide of the invention in close contact with the surface of the workpiece provides for splinterless cutting thereof, especially for doors which may be veneered, varnished or painted.

The invention in a preferred embodiment provides for rapid, convenient workpiece clamping means permanently attached to the saw guide assembly. The clamping means may be swingably attached and further secured to the assembly for convenient portability.

These and other advantages of the present invention will be seen upon reading the following specification and viewing the drawings, which form a part of this application.

DETAILED DESCRIPTION OF THE INVENTION

Figure 1:
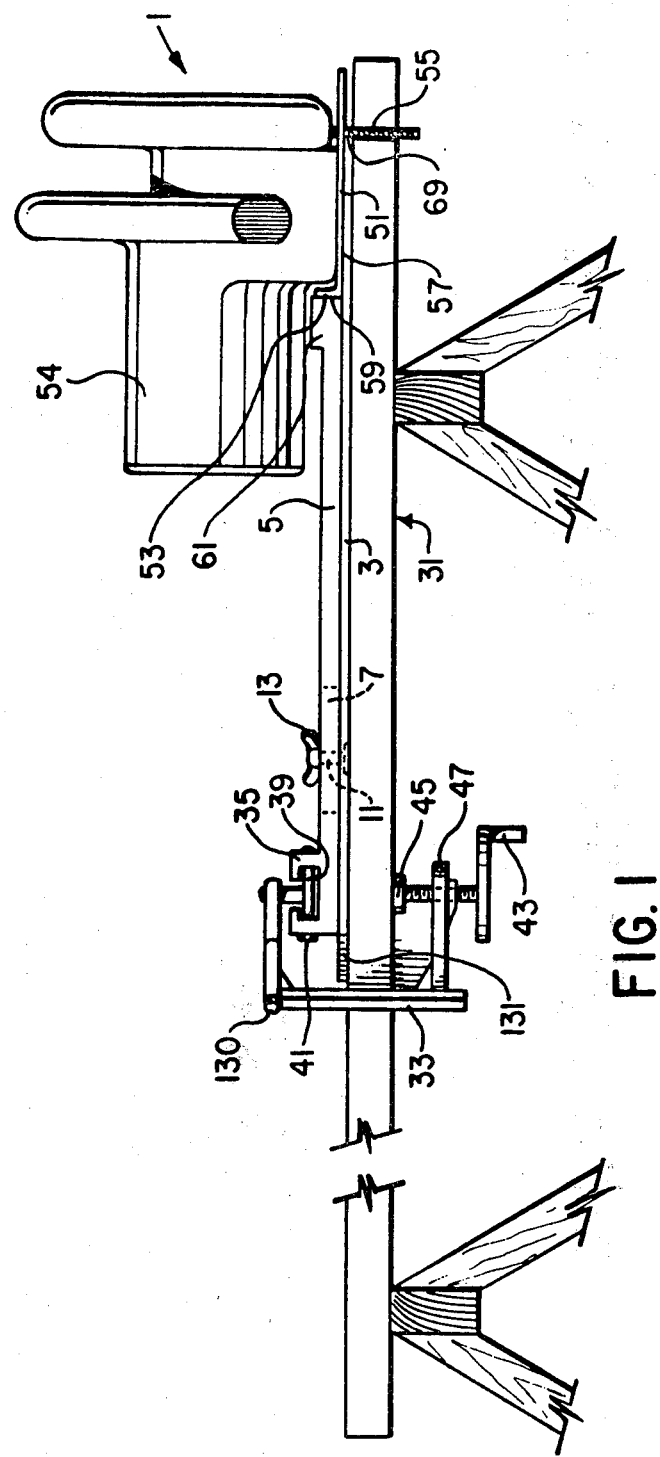
FIG. 1 is a side elevation view of the apparatus mounted on a workpiece such as a door with a circular power saw in cutting position.

Referring to the drawings, as disclosed by FIGS. 1–4 the saw guide assembly 1 is adapted to trim a workpiece 31, such as a door. Saw guide assembly 1 of the invention is comprised of two major components. One component is a trimable base member 3 made of wood, composition board, masonite or any other cutable material. ¼-inch untempered masonite has been found desirable for this purpose. The other major component of the assembly is a shield member 5, which usually has the same width as the base member 3. Aluminum or steel is a desirable material for this component. The shield member 5 is placed on the base member 3 and adjustably secured to it by fastening means. The shield member 5 is long enough so that the motor housing of the saw 54 does not interfere with the clamp track 35 and clamps 33. One embodiment of the invention comprises cutting slots 7 (shown in FIGS. 1, 2 and 3) in the shield member 5 and drilling accommodating holes 9 in the base member 3. The members 3 and 5 may be adjustably secured by a metal fastener 11 which fits in hole 9 and passes through slot 7. The holes 9 are countersunk so that the ends of the fasteners 11 do not protrude beyond the lower surface of the base member 3 where the base member is thick enough to allow for it. Countersinking in this manner prevents the metal fastener from marring the workpiece surface. Alternatively, the fasteners may be covered by masking tape. The fasteners 11 may be glued to the base member 3 to prevent loss of the fastener. A nut 13 of FIG. 3, wing nut or other suitable fastening means screws onto the threads 12 of each fastener 11. Tightening of the nuts 13 on the threads 12 of the fasteners 11 secures the shield member 5 to the base member 3. In a preferred embodiment shown in FIG. 4, threaded tanged fasteners 110 known as T-nuts are driven into the base member 3 at suitable positions 112 and the shield member 5 is secured to the base member 3 by bolts 116 or other suitable elements, which pass through washers 114 and threaded into the T-nuts 110.

Figure 3:
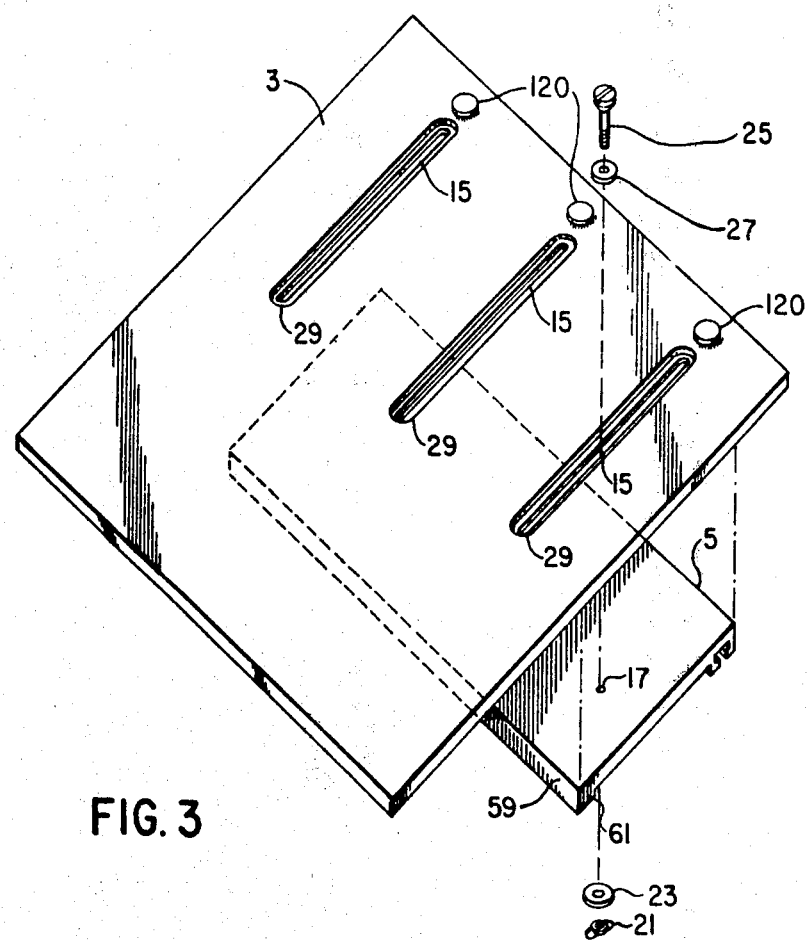
FIG. 3 is a perspective exploded inverted view of the adjustable saw guide assembly shown in FIGS. 1 and 2 illustrating alternative fastening means. The surface contiguous with the workpiece is shown uppermost.
Figure 4:
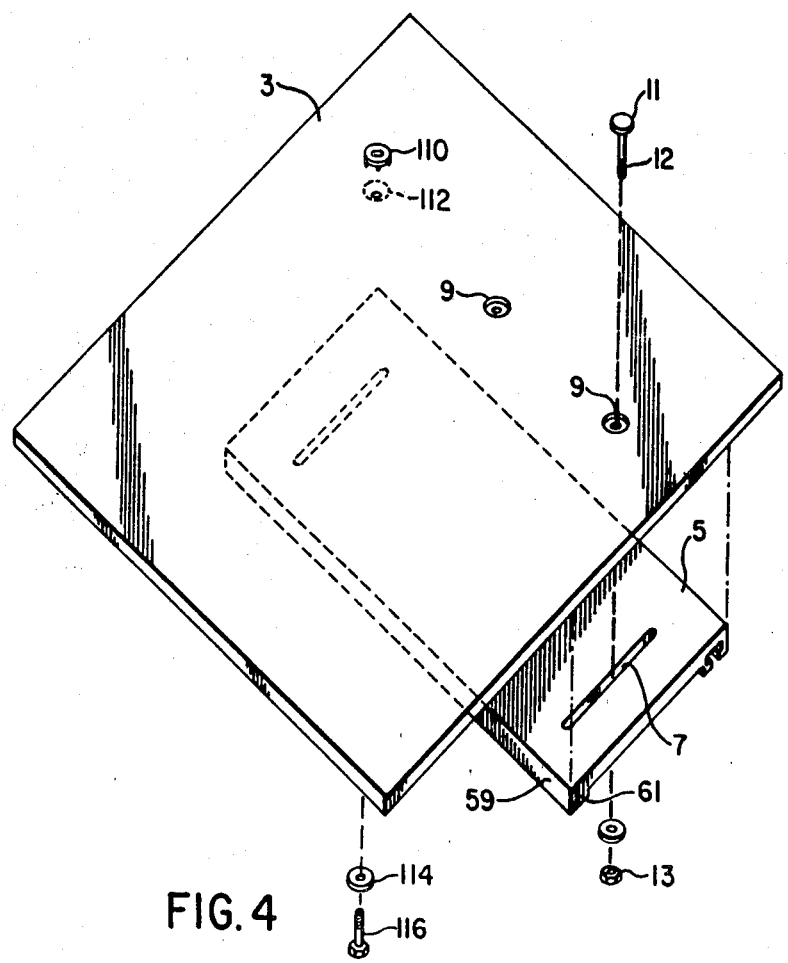
FIG. 4 is a perspective exploded inverted view illustrating an alternative mode of adjustment of the saw guide assembly showing two modes of fastening means.

In an alternative embodiment of the invention shown in FIG. 3 to secure the base member 3 to the shield member 5, slots 15 are cut in the base member 3, and fastening means is passed through each slot 15 and through holes 17 drilled in the shield member 5. One form of means for securing the base member 3 to the shield member 5 is to place a headed bolt 25 through a washer 27 and place both of them into each slot 15. The sides of slot 15 are recessed as shown at 29 to accommodate the fastening means to prevent them protruding from the base member 3 and marring the surface of the workpiece 31 to be cut. Each bolt 25 and washer 27 combinations fits through each hole 17 in the shield member and optionally through another washer 23. A wing nut 21 or other suitable means is then screwed onto the protruding bolt 25 or other suitable fastening element, to tighten the shield member 5 to the base member 3.

Figure 2:
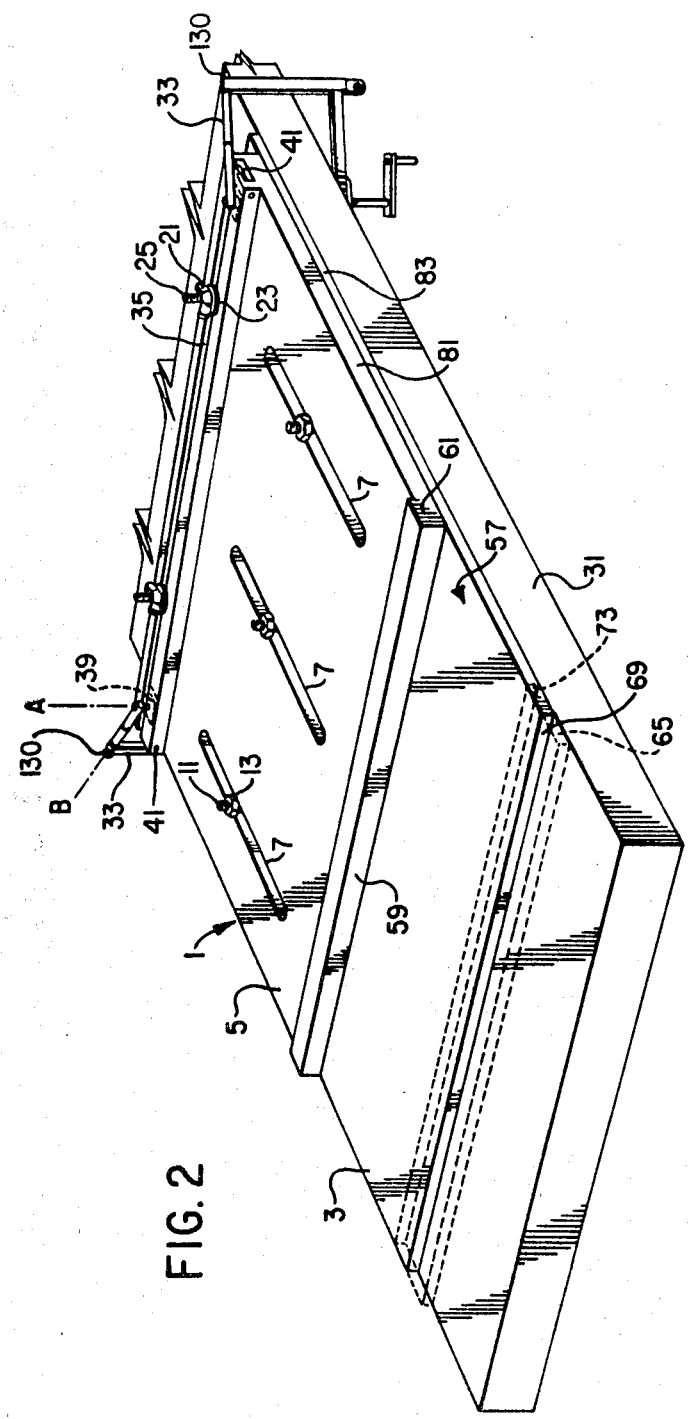
FIG. 2 is a perspective view of the apparatus mounted on the workpiece.
Figure 5:
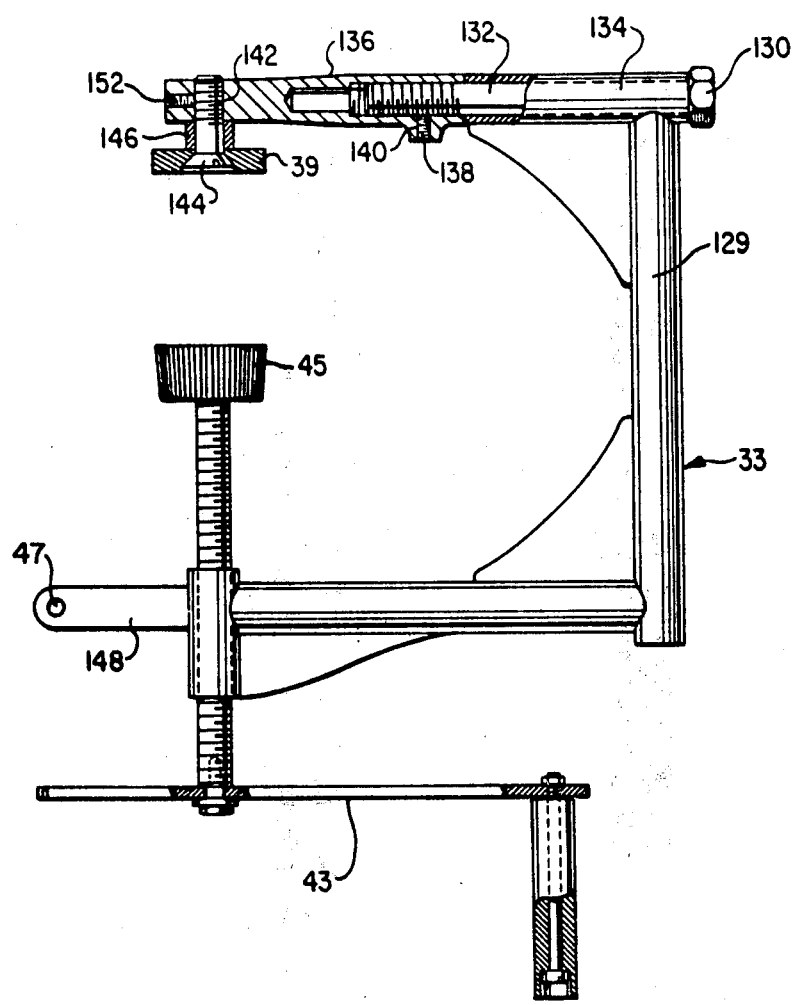
FIG. 5 illustrates the preferred embodiment of the means of the invention for securing the saw guide assembly on the workpiece.

The shield and base member assembly 1 can be secured to the workpiece 31 by suitable clamping means, a preferred embodiment of which is illustrated in FIG. 5, where one or more two-way swing C-clamps 33 are used. Each clamp 33 is provided with a sliding piece 39 adapted to slide in a track 35 provided on the shield member 5. The sliding piece 39 is prevented from leaving the track by stops or pins 41 located close to each end of the track 35. The preferred structure of the clamp 33 shown in FIG. 5, a bolt 132 is adapted to fit through a sleeve 134 located at the top of the body section 129 of the clamp, sleeve 134 being rigidly fixed to body section 129. The bolt 132 has a head 130 and in turn threads into a part 136, which is the outer end portion of one arm of the clamp 33. The bolt 132 can be secured by a set screw 138 through a threaded hole 140 in part 136. The part 136 of the clamp is adapted to rotate along axis B shown in FIG. 2. The part 136 has a threaded hole 142 adapted to receive a bolt 144. Interposed on the bolt 144 between the part 136 and the sliding piece 39 is a sleeve washer 146. A set screw 152 may be used to secure the bolt 144 to allow rotation of the bolt 144 within the sliding piece 39 in operative association with track 35 and the sleeve washer 146, whereby in assembled condition the clamp is also rotatable about an axis A of bolt 144 perpendicular to axis B as shown in FIG. 2.

The combination of both modes of rotation about axes "A" & "B" allows the clamp 33 to conveniently secure the saw guide assembly of the invention to the workpiece 31. When not in use the clamp may be swung onto and lie flat upon the shield member 5. The clamp may be secured in this position by placing the bolt 25, of FIG. 2, through washer 23 then through the hole 47 in clamp appendage 148 and threading the wing nut 21 onto the bolt 24 to secure the clamp 33.

The clamps 33 are cranked open by the crank handle 43 to a width sufficient to accommodate the combined thickness of the saw guide assembly 1 and the workpiece 31. The clamp is fitted with a terminal rubber pad 45 to prevent marring of the workpiece 31. Rubber inserts 120 may also be attached to the lower surface of the base member 3 to provide better grip with the workpiece 31 to be cut and allowing for less clamping pressure to press the lower surface of the base member in contact with the workpiece.

Use of the device is simple and efficient. In one embodiment of the invention the attached clamps are additionally secured, when not in use, by threading the bolt 25 through the top washer 27 thence through the hole 47 shown in FIG. 1, in the two-way swing clamp. The wing nut 21, or other suitable fastening means, engages that portion of the bolt 25 that protrudes through the clamp hole 47, thus securing the clamp 33 to the saw guide assembly 1. In this configuration, the clamps lie flat. When the saw guide assembly is put into use, the clamps are freed. The saw guide assembly 1 is placed on the workpiece 31 and clamped down with the base member 3 positioned to overhang the workpiece 31 to facilitate cutting of the base member 3.

The first step is to sever a portion of the base member 3 in order to accommodate the saw baseplate 51. The saw baseplate 51 is placed upon the upper surface 57 of that portion of the base member 3 which is not overlain by the shield member 5. The edge 53 of the saw baseplate farthest from the saw blade 55, is contiguous with and engages the guide surface 59 of the shield member shoulder 61. The base member 3 is adjusted to the width of saw baseplate 51 by cutting off a portion of the base member denoted as 65 in FIG. 2. The distance from the guide surface 59 to the new guide edge 69, will accommodate the saw baseplate 51 so that the saw blade 55 abuts the new guide edge 69 of the base member 3. This new edge 69 is parallel to the guide surface 59 and serves as a guide to delineate the line of kerf or cut to be made by the saw.

It should be noted that the saw baseplate 51 does not contact the workpiece 31, so it does not mar its surface. Splintering is prevented when the lower surface of the base member 3 is tightly pressed to that portion of the workpiece 31 that will be retained, and more particularly pressing tightly upon that portion of the workpiece immediately adjacent to the kerf being cut by the saw blade 55. This downward support of the upper surface of the workpiece 31 counteracts the saw blades tendency to tear away splinters as the teeth of the blade 55 cut upwardly through the upper surface.

The saw guide assembly 1 can be used to make angle cuts other than perpendicular to a side of the workpiece 31 to be cut, in which case the saw guide assembly 1 is positioned with the guide edge of the base member 3 in alignment with the cut intended to be made in the workpiece.

The workpiece 31 can be cut on the bevel by tilting the saw housing 54 with the saw baseplate 51 while leaving the baseplate in flat contact with the top surface 57 of the base member 3.

With continued use, the guide edge 69 of the base member 3 gets frayed and needs renewing. Renewal may also be necessitated due to the change of blade set occasioned by sharpening of the saw blade. Saw blades are sometimes severely damaged after cutting metal fasteners hidden under the veneer of a workpiece. Such damage necessitates drastic sharpening or a change of the blade. In such cases, a new base member guide edge 73 must be cut. A busy carpenter may have to cut new guide edges several times a day. Readjustment and cutting of a new guide edge is simple and rapid with the apparatus of this invention. The fastening means in both embodiments, (i.e. bolts 11 or 25 shown in FIGS. 3 and 4) are loosened and the shield member 5 is pulled back with respect to the base member 3. The shield member 5 is repositioned a short distance further away from the guide edge 69. Guide markings 131 as shown in FIG. 1 may be marked on the base member 3 on both sides to aid re-positioning said members. In doing this, the edge 81, of the shield member 5, is aligned with the width edge 83 of the base member 3 as shown in FIG. 2. The bolts 11 of the fastening means are then tightened. This adjustment frees more of the base member 3 for cutting to define a fresh new guide edge 73, following the procedure previously described for defining the first guide edge 69. Usually ⅛ inch of the base member 3 is cut away during this procedure. When the base member 3 is used up, a new one can be easily installed by the removal of the fastening means, realignment of the new base member 3 and shield member 5 and reinstallation of the fastening means.

While the invention has been described and illustrated with respect to a preferred embodiment, it will be understood by those skilled in the art that various changes and modifications may be made without departing from the spirit and scope of the invention and it is intended therefore in the appended claims to cover all such changes and modifications.

The embodiments of the invention in which an exclusive property or privilege is claimed are defined as follows:

1. A clamp for use with a power saw guide assembly, which assembly is adapted to rest upon a generally flat work piece which includes an elongate trackway on an upper side thereof, said clamp being generally C-shape and having speed elongate arms extending outwardly from an arm-connecting member, one of said arms having thereon clamp screw means with a work-engaging end portion disposed toward the other arm, a trackway-engaging member on an outer end portion of said other arm, said trackway-engaging member extending from an outer end portion of other arm in a direction transverse to the lengthwise axis thereof, and means for angularly adjusting said outer end portion of the other arm about the lengthwise axis of said other arm.

2. A clamp for use with a power saw guide assembly, as claimed in claim 1, with means providing for rotation of said trackway-engaging member about an axis transverse to the lengthwise axis of said other arm.

3. A clamp for use with a power saw guide assembly, as claimed in claim 2, wherein said trackway engaging member is adapted for sliding engagement in a trackway, and said means providing for rotation of said trackway-engaging member comprises a rotary bearing.

* * * * *

UNITED STATES PATENT AND TRADEMARK OFFICE
CERTIFICATE OF CORRECTION

PATENT NO. : 4,418,902

DATED : December 6, 1983

INVENTOR(S) : Charles A. Genge

It is certified that error appears in the above-identified patent and that said Letters Patent is hereby corrected as shown below:

Column 1, line 11, delete "asembly" and insert --assembly--.

In Claim 1, Column 6, line 15, delete "speed" and insert --spaced--.

Signed and Sealed this

Fourteenth Day of February 1984

[SEAL]

Attest:

GERALD J. MOSSINGHOFF

Attesting Officer    Commissioner of Patents and Trademarks